(12) United States Patent
Hou et al.

(10) Patent No.: US 10,517,052 B2
(45) Date of Patent: Dec. 24, 2019

(54) WIRELESS COMMUNICATION EQUIPMENT AND WIRELESS COMMUNICATION METHOD

(71) Applicant: Sony Corporation, Tokyo (JP)

(72) Inventors: Yanzhao Hou, Beijing (CN); Qimei Cui, Beijing (CN); Qinyan Jiang, Beijing (CN); Hui Liang, Beijing (CN); Shiwei Cao, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 35 days.

(21) Appl. No.: 15/572,513

(22) PCT Filed: Mar. 21, 2016

(86) PCT No.: PCT/CN2016/076837
§ 371 (c)(1),
(2) Date: Nov. 8, 2017

(87) PCT Pub. No.: WO2016/184244
PCT Pub. Date: Nov. 24, 2016

(65) Prior Publication Data
US 2018/0160382 A1 Jun. 7, 2018

(30) Foreign Application Priority Data

May 15, 2015 (CN) .......................... 2015 1 0249732

(51) Int. Cl.
*H04W 56/00* (2009.01)
*H04W 8/00* (2009.01)
(Continued)

(52) U.S. Cl.
CPC ......... *H04W 56/001* (2013.01); *H04W 8/005* (2013.01); *H04W 48/10* (2013.01); *H04W 56/0045* (2013.01); *H04W 72/048* (2013.01)

(58) Field of Classification Search
CPC ............. H04W 56/001; H04W 72/048; H04W 56/0045; H04W 8/005; H04W 48/10
(Continued)

(56) References Cited

U.S. PATENT DOCUMENTS

2015/0124579 A1* 5/2015 Sartori ..................... H04J 11/00
370/210
2016/0174179 A1* 6/2016 Seo .................. H04W 56/0015
370/350

(Continued)

FOREIGN PATENT DOCUMENTS

CN           103929747 A      7/2014
CN           104105155 A      10/2014
WO    WO 2015/066632 A1      5/2015

OTHER PUBLICATIONS

U.S. Appl. No. 62/013,517.*

(Continued)

*Primary Examiner* — Faisal Choudhury
(74) *Attorney, Agent, or Firm* — Xsensus LLP

(57) ABSTRACT

A wireless communication equipment and a wireless communication method. The wireless communication equipment used for a user equipment side includes one or more processors. The processors are configured to determine indication information about a type of another user equipment carried in a synchronizing signal from the user equipment, the type including a first type and a second type. The processors are also configured to determine, based on the indication information, corresponding device-to-device communication operation of a user equipment aiming at another user equipment.

17 Claims, 11 Drawing Sheets

(51) Int. Cl.
  *H04W 48/10* (2009.01)
  *H04W 72/04* (2009.01)

(58) Field of Classification Search
  USPC .......................................................... 370/350
  See application file for complete search history.

(56) References Cited

U.S. PATENT DOCUMENTS

| | | | | |
|---|---|---|---|---|
| 2016/0192420 A1* | 6/2016 | Kim | ...................... | H04W 74/00 |
| | | | | 370/329 |
| 2016/0366658 A1* | 12/2016 | Chae | ...................... | H04L 5/0048 |
| 2017/0265154 A1* | 9/2017 | Seo | ......................... | H04J 11/00 |
| 2018/0139681 A1* | 5/2018 | Jung | ...................... | H04W 40/22 |
| 2018/0160382 A1* | 6/2018 | Hou | ........................ | H04W 4/00 |

OTHER PUBLICATIONS

International Search Report dated Jun. 15, 2016 in PCT/CN2016/076837, 2 pages.
Samsung, "Time synchronization for D2D broadcast communication in out of network coverage", 3GPP TSG RAN WG1 Meeting #75, R1-135219, 2013, 6 pages.

* cited by examiner

US 10,517,052 B2

WIRELESS COMMUNICATION EQUIPMENT AND WIRELESS COMMUNICATION METHOD

FIELD

The present disclosure generally relates to the technical field of wireless communication, and more particular, to a wireless communication device and a wireless communication method for user equipment side as well as a wireless communication device and a wireless communication method for base station side.

BACKGROUND

Proximity services (ProSe) are a kind of services provided by a 3GPP system based on user terminals close in distance, which mainly provide functions such as proximity device discovery, device communication, and user equipment (UE)-to-network relay (UE-to-Network Relay). The UE-to-network relay refers to, for example, providing a unicast relay service for a remote UE using a network relay UE. That is, the remote UE communicates with a PDN (Packet Data Network) through the network relay UE. In addition, synchrozation reference and transmission of other communication content may be performed between UEs through device-to-device (D2D) communication.

With regard to the D2D communication, the 3GPP currently focuses on device discovery and broadcast communication. As a basis for device discovery, a D2D synchronization source needs to transmit a D2D synchronization signal (D2DSS) to support D2D synchronization.

SUMMARY

An overview of the embodiments of the present disclosure is given hereinafter to provide basic understanding regarding some aspects of the present disclosure. However, it should be understood that the overview is not an exhaustive overview of the present disclosure, and is not intended to determine a critical part or an important part of the present disclosure, or to limit the scope of the present disclosure. The overview is only intended to give some concepts of the present disclosure in a simplified way, to serve as a preface of detailed description given later.

According to an embodiment, a wireless communication device for user equipment side is provided, which includes at least one processor. The processor is configured to determine indication information relating to the type of another user equipment carried in a synchronization signal from the other user equipment, wherein the type includes a first type and a second type. The processor is further configured to determine, based on the indication information, a corresponding device-to-device communication operation of the user equipment with respect to the other user equipment.

According to another embodiment, a wireless communication method performed at user equipment side is provided. The method includes a step of determining indication information relating to the type of another user equipment carried in a synchronization signal from the other user equipment, wherein the type includes a first type and a second type. The method also includes a step of determining, based on the indication information, a corresponding device-to-device communication operation of the user equipment with respect to the other user equipment.

According to another embodiment, a wireless communication device for user equipment side is provided, which includes at least one processor. The processor is configured to determine a device-to-device communication requirement of the user equipment and the type of the user equipment. The processor is further configured to generate a synchronization signal for device-to-device communication based on the type of the user equipment, wherein the type includes a first type and a second type, and the synchronization signal carries indication information relating to the type of the user equipment.

According to another embodiment, a wireless communication method performed at user equipment side is provided. The method includes a step of determining a device-to-device communication requirement of the user equipment and the type of the user equipment. The method also includes a step of generating a synchronization signal for device-to-device communication based on the type of the user equipment, wherein the type includes a first type and a second type, and the synchronization signal carries indication information relating to the type of the user equipment.

According to another embodiment, a wireless communication device for base station side is provided, which includes at least one processor. The processor is configured to determine the type of a user equipment served by the base station. The processor is further configured to determine for the user equipment, information relating to a root index corresponding to a synchronization signal sequence available to the user equipment, based on the type of the user equipment, wherein the type includes a first type and a second type, and root indexes of synchronization signals available to different types of user equipments belong to different sets.

According to the embodiments of the present disclosure, by using the synchronization signal to carry information relating to the type of a user equipment, and determining a corresponding operation according to the type, extra information exchanging processes between user equipments can be avoided, thus beneficial for improving the communication efficiency.

BRIEF DESCRIPTION OF THE DRAWINGS

The present disclosure may be better understood by reference to the following description taken in conjunction with the accompanying drawings, in which like or similar reference numerals are used throughout the drawings to refer to the same or like parts. The accompanying drawings, together with the following detailed description, are included in this specification and form a part of this specification, and are used to further illustrate preferred embodiments of the present disclosure and to explain the principles and advantages of the present disclosure. In the accompanying drawings.

DETAILED DESCRIPTION OF EMBODIMENTS

In the following, embodiments of the present disclosure will be described with reference to the accompanying drawings. Elements and features described in one of the drawings or one embodiment of the present disclosure may be combined with elements and features described in one or more other drawings or embodiments. It should be noted that for purposes of clarity, the expression and description of components and processes known to those skilled in the art, which are not relevant to the present disclosure, are omitted from the accompanying drawings and the description.

Figure 1:
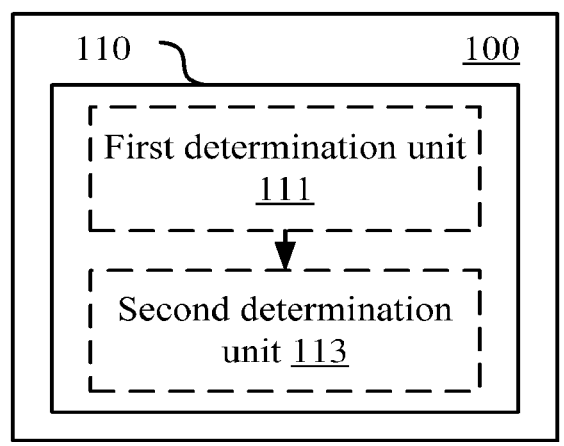
FIG. 1 is a block diagram illustrating a configuration example of a wireless communication device for user equipment side according to an embodiment of the present disclosure.

As shown in FIG. 1, a wireless communication device 100 according to the present embodiment includes a processor 110. It is to be noted that although a first determination unit 111 and a second determination unit 113 in the processor 100 are shown with separate dashed boxes, it is to be understand that the functions of the first determination unit 111 and the second determination unit 113 can also be implemented by the processor 110 as a whole, and is not necessarily implemented by discrete actual components in the processor 110. In addition, although the processor 110 is illustrated with one box in FIG. 1, the wireless communication device 100 may include multiple processors, and the functions of the first determination unit 111 and the second determination unit 113 may be distributed to the multiple processors, so that these functions can be performed by the multiple processors in cooperation.

The first determination unit 111 is configured to determine indication information relating to the type of another user equipment carried in a synchronization signal from the other user equipment. The type may include a first type and a second type.

The first type and the second type may have different specific meanings depending on specific applications. For example, as illustrated later in conjunction with specific embodiments, the above types may involve, for example, a device providing a relay service and a device not providing a relay service among D2D devices, a party providing a synchronization reference and a party not providing synchronization reference in D2D communication, the priority of the communication content transmitted in D2D communication, or the like. In the following, a device providing a relay service among D2D devices may be referred to as a "relaying party", a "relaying device", a "relaying user equipment", or the like. The device not providing a relay service among D2D devices may be referred to as a "relayed party", a "relayed device", a "relayed user equipment", or the like. However, it should be noted that, this statement is only to distinguish the device providing a relay service and the device not providing a relay service among the D2D devices. Specifically, the device referred to as the "relaying party" or a similar expression is not necessarily a user equipment providing or to provide a relay service for another user equipment, and may be, for example, a user equipment having the capability of providing a relay service for another user equipment. The user equipment may transmit a synchronization signal and may serve as a party providing a relay service in an established D2D communication. In addition, the device referred to as the "relayed party" or a similar expression is not necessarily a user equipment being provided or to be provided with a relay service by a user equipment, and may be, for example, an ordinary user equipment that wishes to perform a D2D communication. The user equipment may transmit a synchronization signal and may serve as a relayed party in an established D2D communication.

In addition, although the two types are described in the embodiment, the present disclosure is not limited thereto. In other embodiments, the type indicated by the indication information may include three or more types. For example, in a case where the type is determined according to the priority of the communication content transmitted in the D2D communication, the corresponding user equipment may be one of three or more types according to the priority (for example, very important, important, general, and the like) of the transmitted communication content.

The second determination unit 113 is configured to determine, based on the above described indication information, a D2D communication operation of the user equipment with respect to the other user equipment.

Similarly, the D2D communication operation determined by the second determination unit 113 may correspond to the above types according to specific applications. For example, in a case where the above type relates to a relaying party and a relayed party among D2D devices, the corresponding D2D communication operation may involve, for example, whether to request for access to a relaying device or whether to accept an access request of a relayed device. In a case where the above type relates to a party providing a synchronization reference and a party being provided with a synchronization reference in a D2D communication, the corresponding D2D communication operation may involve, for example, whether to synchronize with the party serving as the synchronization reference. Or, in a case where the above type relates to the priority of communication content transmitted in a D2D communication, the corresponding D2D communication operation may involve, for example, preferential transmission or reception of the communication content having a high priority. However, it is to be understood that the present disclosure is not limited to the above examples.

With the above described embodiment, by carrying the type information of the user equipment in the synchronization signal, and determining a corresponding operation according to the type, for example, additional information exchange for further determining the type of the device can be omitted, thus the communication efficiency can be improved, for example, the signaling overhead can be reduced and the time required to establish a communication can be shortened.

According to a specific embodiment, the processor 110 (the first determination unit 111) may be configured to determine, based on a synchronization signal, a synchronization signal sequence contained in the synchronization signal, and determine, based on a root index corresponding to the synchronization signal sequence, whether the other user equipment is a first-type device or a second-type device.

In some applications, the synchronization signal sequence may include a primary synchronization signal (PSS) sequence and a secondary synchronization signal (SSS) sequence, and the information such as a device identification and a monitor timing may be uniquely determined based on the combination of the PSS sequence and the SSS sequence. It is to be noted that, in a case where the synchronization signal sequence includes the PSS sequence and the SSS sequence, the above mentioned device type may be determined based on the root index of the PSS sequence, or the above mentioned device type may be determined based on the root index of the SSS sequence.

As mentioned above, the type of the device may relate to the relaying party and the relayed party among D2D devices, the party providing a synchronization reference and the party not providing a synchronization reference in a D2D communication, the priority of the communication content transmitted in the D2D communication, or the like. Next, exemplary embodiments of the present disclosure are respectively described with respect to these aspects.

According to an embodiment, the second-type device of the second type can obtain a communication service through the relay of the first-type device of the first type in a D2D communication. The D2D communication includes, for example, proximity service direct communication (ProSe-DirectCommunication) in the Long Term Evaluation (LTE) standard. The D2D may also include vehicle-to-vehicle (V2V) communication or vehicle to another device (V2X) communication.

In a case where an indication information based on a synchronization signal from another user device indicates that the other user equipment is the first type device (the party that provides a relay, which may also be referred to as PUE hereinafter), the processor 110 may further be configured to generate access request information for the other device. That is, in this case, the wireless communication device 100 may transmit a request to the other user equipment to access the network as a relayed party (which may also be referred to as CUE hereinafter) via the other user equipment. In this case, the second determination unit 113 determines that the corresponding D2D communication operation of the user equipment with respect to the other user equipment may include initiating an access request for the other user equipment.

According to another embodiment, the first type device of the first type can serve as a synchronization reference for the second type device of the second type in the D2D communication (as mentioned in the third generation partner project specification 3GPP TS 36.300). That is, in this embodiment, device types may be divided in accordance with whether a device can serve as a synchronization source. For example, it is possible to determine whether or not a UE can serve as a reference for a synchronization source based on whether the UE is equipped with a precise timing module such as a network identity and time zone (NITZ) module, a network time protocol (NTP) module, or a global navigation satellite system (GNSS) module.

Accordingly, in a case where the other user equipment is determined to be the first type device based on the indication information, the processor 110 may be configured to control to synchronize with the other user equipment. In other words, in this case, the second determination unit 113 determines, based on the indication information, the corresponding D2D communication operation of the user equipment with respect to the other user equipment may include a synchronization operation performed in the case of taking the other user equipment as a synchronization reference.

According to yet another embodiment, the D2D communication content transmitted by the first type device of the first type has a higher priority as compared with the communication content transmitted by the second type device of the second type. That is, in this embodiment, device types are divided according to the transmitted content. For example, the content with a high priority may include emergency public security events or the like. In addition, it is to be noted that the transmitted content is not an inherent characteristic of a user equipment, so the type of the user equipment can be dynamically changed depending on the transmitted content. In addition, as mentioned above, the number of the number of types of user equipment is not limited to two, and the number of the types of user equipment may be three or more depending on the manner of priority division of communication content.

The processor 110 may be configured to preferentially read data transmitted by the other user equipment in a case where the other device is determined to be the first type device based on the indication information. In other words, in this case, the second determination unit 113 determines, based on the indication information, the corresponding D2D communication operation of the user equipment with respect to the other user equipment may include preferentially reading the data transmitted by the other user equipment. The preferential reading described herein may mean, for example, that the data transmitted by the other user equipment must be read, or the communication data of a UE with a high priority is read preferentially when multiple other UEs are broadcasting.

In addition, according to an embodiment, the processor 110 (the first determination unit 111) may be configured to determine the indication information carried in a synchronization signal on an unauthorized frequency band from the other user equipment. The root index corresponding to a synchronization signal sequence may contain a root index corresponding to a synchronization signal sequence for a cell. In other words, the synchronization signal transmitted by the other user equipment on an unauthorized frequency band may be received, and the synchronization signal sequence may reuse the synchronization signal sequence for the cell. The advantage of the embodiment is that, since the cell does not transmit a synchronization signal on the unauthorized frequency band in the existing application scenario, and only the UE transmits the synchronization signal on the unauthorized frequency band, so the information for D2D communication can be carried by the UE by reusing cell resources such as a physical cell identity (PCI), i.e. the PSS sequence and the SSS sequence, on the unauthorized frequency band, for indicating the type of the UE, for example. In this example, a number of PSS/SSS sequences available to the UE increases, which facilitates distinguishing different UE types according to the PSS/SSS sequence.

Next, the embodiment is described mainly with respect to the example in which the type of the UE relates to the relaying party and the relayed party among D2D devices. It is to be understood that, some aspects of the following specific example may also be applied to embodiments involving other UE type divisions.

Figure 2:
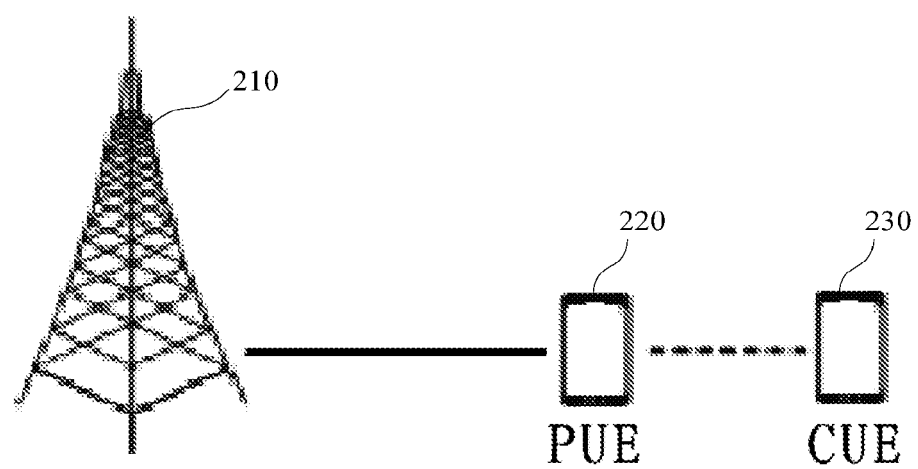
FIG. 2 is a schematic diagram illustrating UE-to-Network Relay.

FIG. 2 is a schematic diagram illustrating a UE-to-network relay, where the user equipment 230 (which may also be referred to as a relayed UE, or CUE) can obtain access to the network through the relay of the user equipment 220 (which may also be referred to as a relaying UE, or PUE). Although the base station 210 of the cellular network is shown as an example in FIG. 2, the access to a wireless network (WiFi) such as a WiFi hotspot may also be relayed. In addition, the PUE 220 and the CUE 230 may be user equipments served by the same operator, or user equipments served by different operators.

First, a brief description of the existing manner related to the synchronization in a D2D communication is provided. For D2D communication, currently the 3GPP mainly focuses on device discovery and broadcast communication. As a basis for device discovery, the D2D synchronization source needs to transmit a D2D synchronization signal in order to support D2D synchronization. Since there are interferences between the D2D synchronization signal and the synchronization signal transmitted by the cell, a specialized primary synchronization signal sequence is designed for D2D in the existing manner, and the corresponding root index is in the range of {26, 37}, thereby eliminating the interferences with the cell synchronization signal.

According to an exemplary embodiment of the present disclosure, on an unauthorized frequency band, the UE may reuse the physical cell identity (PCI), and divide, according to the PSS root index such as {25, 29, 34}, the PCI into two parts, which identify PUE and CUE, respectively. Considering the actual situation, the number of CUEs in a cell is greater than that of PUEs. Therefore, the following exemplary settings can be made:

PUE ID: the PSS root index is {25}, the range is {0-167};

CUE ID: the PSS root index is {29, 34}, the range is {168-503}.

Furthermore, in a case that the numbers of PUEs and CUEs are increased, a new root index {26, 37} can be used to expand the numbers of PUE IDs and CUE IDs, for example:

PUE ID: the PSS root indexes are {25, 26}, the ranges are {0-167}, {504-671};

CUE ID: the PSS root indexes are {29, 34, 37}, the ranges are {168-503}, {672-839}.

In the above, an exemplary embodiment in which the synchronization signal is transmitted on the unauthorized frequency band and the synchronization signal sequence for a cell is reused as the synchronization signal sequence is described. However, it is to be understood that the present disclosure is not limited to the specific details in the above examples such as the specific allocation manner of the root index.

Next, an exemplary configuration related to the process of the D2D device discovery in the embodiment of the present disclosure will be described. It is still to be noted that, in the following, the embodiment is described with respect to the example in which the UE type relates to the relaying party and the relayed party among D2D devices. It is to be understood that, some aspect of the following specific example may also be applied to embodiments involving other UE type divisions.

According to an embodiment, the processor 110 (the second determination unit 113) may be configured to determine a monitor timing of the other user equipment based on the synchronization signal from the other user equipment, for controlling the transmission of access request information according to the monitor timing. In the embodiment, the user equipment 100 needs to connect to the network, for example, through the relay of another user equipment, where the other user equipment can operate as a relaying device, and the user equipment 100 is to operate as a relayed device. In this case, in order to establish connection with the other user equipment, the user equipment 100 needs to transmit a request to the relaying device. The above mentioned monitor timing is determined based on the synchronization signal from the other user equipment.

For example, according to an exemplary configuration, the monitor timing is determined to be later than a timing of the synchronization signal by a predetermined time interval. According to the configuration, the user equipment 100 can transmit access request information at a predetermined timing after receiving the synchronization signal, so that the other user equipment can receive the request information within the monitor timing.

In addition, the monitor timing may be different for different relaying user equipments. For example, according to an embodiment, the processor 110 may be configured to determine an identification of the other user equipment based on the synchronization signal from the other user equipment, and determine the predetermined time interval for monitoring based on the identification of the other user equipment. With the configuration, for example in a case where the discovery signals of the multiple other user equipments are received simultaneously by the user equipment 100, it is possible to avoid the case where the access requests to multiple other user equipments from the user equipment 100 interfere with each other due to that same monitor timing is employed.

In the above embodiment, the interference of the user equipment 100 on access requests of different other user equipments is avoided by employing different monitor timing intervals. In addition, according to another embodiment, the processor 110 may be configured to determine the identification of the other user equipment based on the synchronization signal from the other user equipment, and the generated access request information contains the identification of the other user equipment. In this way, the other user equipment which received the access request can determine whether the access request is an access request for itself according to the identification information contained in the request information.

Next, the device discovery manner as a specific example of the above described embodiment will be described with reference to FIG. 3 and FIG. 4. It is to be noted that, the following exemplary manner is applicable to situations in which the relaying user equipment and the relayed user equipment belong to the same operator or belong to different operators, and situations in which the relayed user equipment is located within or outside the coverage of the cell.

The user equipment to serve as the relaying party (PUE) periodically broadcastsdiscovery information, for example, on an unauthorized frequency band. The signal includes the PSS/SSS (in addition, the signal may also include information such as the connection type information of the PUE of the signal, the operator information and information on the connection quality to the network).

Figure 3:
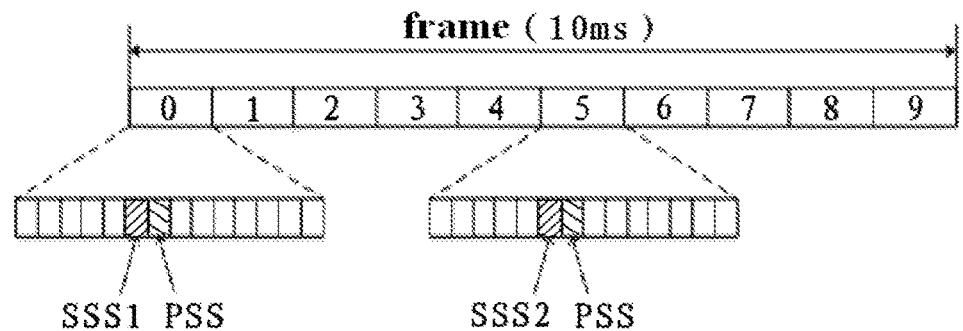
FIG. 3 is a schematic diagram illustrating an exemplary configuration of a synchronization signal in this configuration.

Referring to FIG. 3, an example of locations of corresponding sub-frames of two sets of synchronization signaling in the time domain is illustrated. Two sets of special signaling PSS and SSS are broadcasted in the downlink to assist cell searching, where the PSS is transmitted by occupying the last symbol of the first timeslot on subframes 0 and 5, and the SSS is transmitted by occupying the penultimate symbol of the same timeslot, where the SSS is on the symbol previous to that of the PSS.

Figure 4:
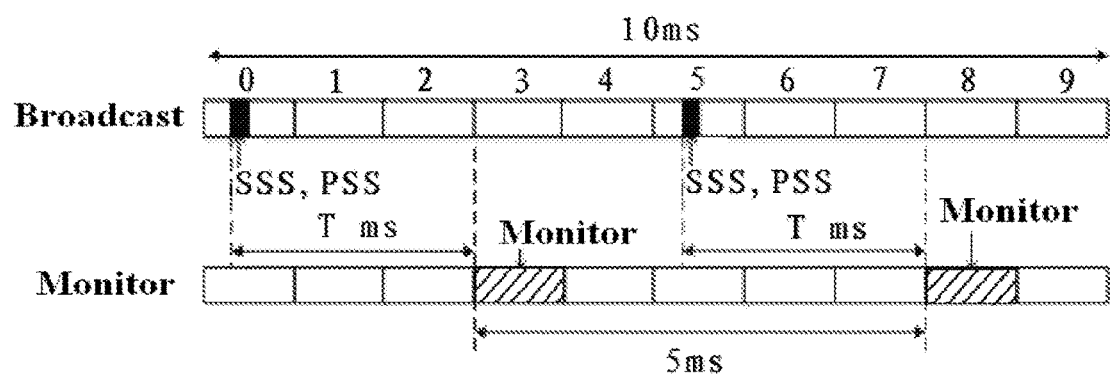
FIG. 4 is a schematic diagram illustrating a monitor timing of an access request information for establishing Device-to-Device communication according to an embodiment.

As shown in FIG. 4, the PUE monitors access request information from the CUE after a specific time period (for example, T ms, where 0<T<4).

Optionally, a base station or the PUE may configure a CUE access upper limit, and the PUE stops broadcasting the discovery information if the number of accessed CUEs reaches the upper limit.

Optionally, the monitor timing of each PUE, i.e. the T ms time period, may be configured according to the ID of the PUE (the PUE ID is, for example, assigned by a base station to a UE when the base station allows the UE to be a PUE for identifying and managing the existing PUE. However, in other cases, for example, the T ms time period may be configured directly based on the UE ID such as RNTI. The case also applies to the CUE ID). For example, T can be determined based on the modulus of the ID number of the PUE with respect to 4 (that is, Mod(PUE ID, 4)) and according to the following exemplary mapping relationship: T is set to be 1 when the modulus is 0, T is set to be 2 when the modulus is 1, T is set to be 3 when the modulus is 2, and T is set to be 4 when the modulus is 3.

Optionally, a base station or the PUE may configure the CUE access upper limit, and if the number of CUEs of a certain PUE reaches the upper limit, the PUE stops broadcasting the discovery information.

When activated to be a CUE, the UE monitors the PUE broadcast information on an unauthorized frequency band. When the CUE monitors and identifies the PSS which has, for example, an root index {25}, the following information can be obtained for example:

5 ms time period timing of the PUE (the transmission interval of two adjacent PSSs);

the received power of the PSS, which can be one of the criteria for determining whether the CUE is to access to the current PUB; and the location of the SSS signal, where the relative location of the SSS and the PSS is fixed.

After the PSS is monitored by the CUE, the SSS signal having a fixed relative location with respect to the PSS can be known, thereby the CUE can further obtain the following information:

the 10 ms frame timing of the PUE (which determines the whole frame);

the PUE ID; and the monitor location of the PUE, for example, the monitor timing location of the PUE can be obtained according to the value of the PUE ID modulo 4.

In addition, there may be a case where multiple PUEs are detected by the CUE. In this case, the PUE with the best access link quality can be selected according to the received power of PSS. Optionally, the PUE may broadcast information such as its PUE connection type information (for example, whether the network to which it accessed is a cellular network or a WiFi network), operator information and the connection quality to the network, and the CUE may synthesize these information and select the most suitable PUE to access. Accordingly, according to an embodiment, in a case where there are multiple user equipments which are accessible, a wireless communication device according to an embodiment of the present disclosure may be configured to determine a user equipment to access according to one or more of the following aspects: the type of communication service relayed by the accessible user equipment; network connection quality of the accessible user equipment; a distance from the accessible user equipment; and quality of a signal from the accessible user equipment. As mentioned above, such a selection may be performed at base station side (based on the user equipment information maintained by the base station), or may be performed at UE side. In the scheme of performing the above selection by the UE, the above information may be included in the discovery signal, so that the UE can select the device to access based on the information.

When the CUE chooses to access a certain PUE, since CUE has obtained the monitor timing of the PUE after the PSS is monitored by the CUE, the CUE transmits access request information to the PUE according to the monitor timing information. The information may include a synchronization signal of the CUE. As mentioned above, optionally, the information may also include the ID of the CUE and the ID of the PUE to which the CUE chooses to access.

Specifically, the following network-assisted discovery process can be performed in a case where the PUE and the CUE belong to the same operator.

In the scenario of single operator, when the CUE is located within the coverage of the cell, the base station can assist the PUE and the CUE to perform device discovery based on pre-acquired information. The pre-acquired information may include, for example, an ID and a location of the user equipment which can serve as a PUE, the type of a network (a cellular network or a WiFi) accessed by the user equipment, and whether the user equipment is authorized to use a shared frequency band, and the like, as well as the ID, the location, and the like of the user equipment that desires to serve as the CUE. As compared with the direct discovery by the device, the discovery process can be simplified with the assistance of the base station. The base station can obtain the proximity relationship of the PUE and the CUE according to the pre-acquired location information, so as to obtain information of a PUE within a certain distance range and transmit the information of the PUE to the CUE. The CUE searches for the PUE based on the obtained information of PUE, and determines whether to access the PUE.

It is to be noted that the invention is not limited to the details of the above-described specific examples such as settings of the frame timing and the monitor timing.

Next, a configuration example of a wireless communication device for user equipment side according to another embodiment of the present disclosure will be described with reference to FIG. 5.

Figure 5:
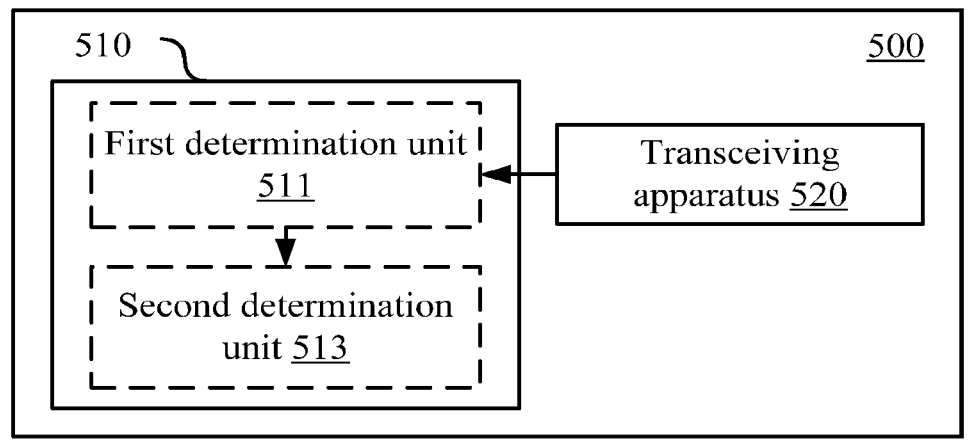
FIG. 5 is a block diagram illustrating a configuration example of a wireless communication device for user equipment side according to another embodiment.

As shown in FIG. 5, the wireless communication device 500 includes at least one processor 510 and a transceiving apparatus 520. The processor 510 (including a first determination unit 511 and a second determination unit 513) may have a configuration similar to the processor 110 (including the first determination unit 111 and the second determination unit 113) described above. The transceiving apparatus 520 is configured to receive a synchronization signal from another user equipment on an unauthorized frequency band.

The unauthorized frequency band for transmitting the synchronization signal may be agreed upon in advance. For example, the user equipment may transmit a D2D discovery signal on an unauthorized frequency band according to a pre-determined agreement. In addition, the number of default unauthorized frequency bands may be plural, and a frequency band with a lower interference is generally preferable. Optionally, the base station may dynamically adjust the configuration of the above default frequency band and inform it to PUEs and CUEs through broadcast information. Accordingly, according to an embodiment, the processor 510 is configured to determine an unauthorized frequency band on which a synchronization signal from another user equipment is received based on broadcast information from the serving cell.

An example of a device discovery process between the PUE and the CUE is described above. Next, an example of an activation process of a user equipment according to an embodiment of the present disclosure when requesting to be a CUE is described.

The user equipment requesting to be a CUE may be located within the network coverage and may be outside the network coverage. In the case where the user equipment is located within the network coverage, the user equipment may request the network to designate the user equipment as a CUE. In the case where the user equipment is located outside the network coverage, the user equipment can autonomously designate itself as a CUE according to the communication requirement.

Specifically, according to an embodiment, in the case where the user equipment is located within the network coverage, the user equipment may generate activation request information for requesting the serving cell to designate it as a CUE. The activation request information may also include a device identification of the user equipment. In addition, the activation request information may further include location information of the user equipment. The serving cell can perform processings such as information maintenance of the CUE, quantity control of the CUE and the network-assisted discovery of the PUE using the information.

On the other hand, in the case where the user equipment is located outside the coverage of the serving base station, the user equipment can select a root index from a predetermined root index set and generate the synchronization signal of the user equipment based on the root index. In this case, the user equipment can be autonomously activated to be the CUE by, for example, randomly selecting a CUE ID from the predetermined set without transmitting the activation request information.

Next, a specific example of the CUE activation process will be described with reference to FIG. 6. It is to be noted that the specific details described in the following example are merely illustrative and not restrictive.

Figure 6:
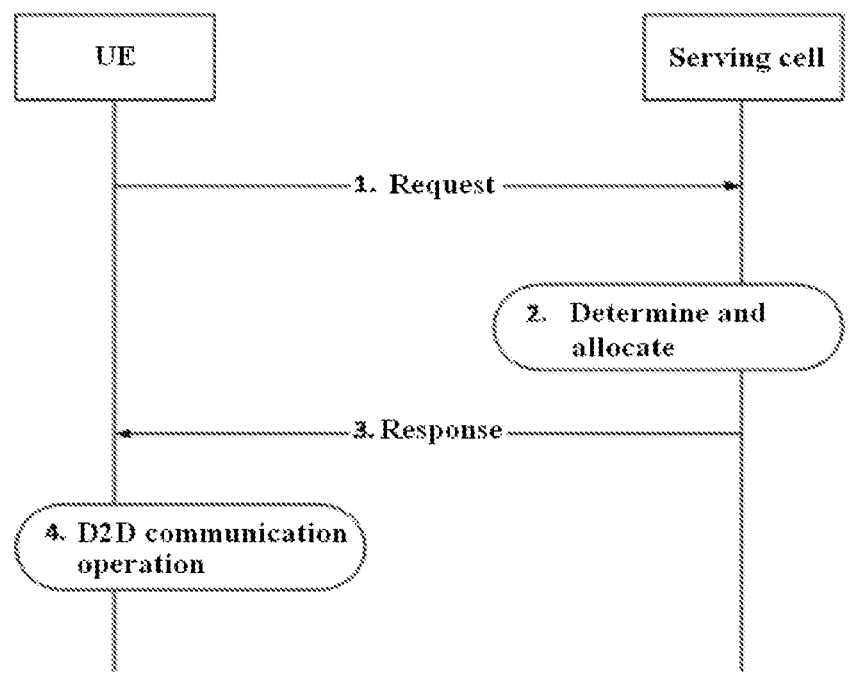
FIG. 6 is a schematic diagram illustrating an example of a communication procedure between a user equipment and a serving cell when the user equipment performs an activation request to the serving cell according to an embodiment.

As shown in FIG. 6, at Step 1, when a UE needs to share a network connection of a PUE, the UE first transmits the CUE activation request information to the serving cell, which includes, for example, the ID information of the UE.

After reception of the CUE activation request information from the UE, at Step 2, the serving cell allocates an available CUE ID for the UE based on, for example, information stored in an information table regarding CUEs maintained by the serving cell, and updates the information table.

The information table may include, for example, information such as UE IDs, UE locations, and CUE IDs assigned to UEs which serve as CUEs.

The functions of maintaining the above information table by the serving cell include:

for managing CUE IDs, when a new UE requests to be activated as a CUE, an unused CUE ID is assigned to the CUE based on the table; and for performing base station-assisted device discovery, the base station can discover a proximity relationships between PUEs and CUEs according to the location information in the information table of CUEs and a corresponding information table of PUEs, transmit PUE information (such as PUE type and PUE ID) to a CUE, so as to assist the PUE to establish a connection with the CUE.

With continuing reference to FIG. 6, in Step 3, the serving cell transmits CUE activation request response information to the UE. The serving cell searches for a PUE within a certain distance from the UE based on the PUE information table. If there is a PUE within a certain distance from the UE, relevant PUE information and the assigned CUE ID are informed to the UE; if there is no PUE within a certain distance from the UE, only the assigned CUE ID is transmitted.

After reception of the request acception information, at Step 4, the UE is activated to be the CUE and monitors the discovery signal broadcasted by a PUE on the unauthorized frequency band.

The example procedure of the user equipment requesting to be a CUE is described above. It should be understood that certain aspects of the above examples also apply to embodiments of other UE classifications. For example, in a case where the UE requests to be a party providing a synchronization reference in a D2D communication (for example, when it is necessary to obtain a synchronization reference from another UE), or in the case where the UE requests to be a party which transmits the communication content with a higher priority in a D2D communication (for example, in the case where the UE needs to transmit information related to an emergency public security event), an activation request may be made using a configuration similar to that described in the example above.

In addition, the above access request process may be triggered based on various predetermined trigger conditions.

According to an embodiment, the user equipment triggers a detection of synchronization signal from another user equipment in a case where the communication quality of the user equipment is below a predetermined level.

Alternatively, the above activation request may be triggered by network side. For example, for the above example of relay connection, the above activation request may be triggered based on the need for network offload. A specific example of this process will be described later in an embodiment for base station side.

In the above description on the wireless communication device according to the embodiments of the present disclosure, it is apparent that some processing procedures are also disclosed. Next, a process example of a wireless communication method for user equipment side according to an embodiment of the present disclosure will be described without repeating some details di scribed above.

Figure 7:
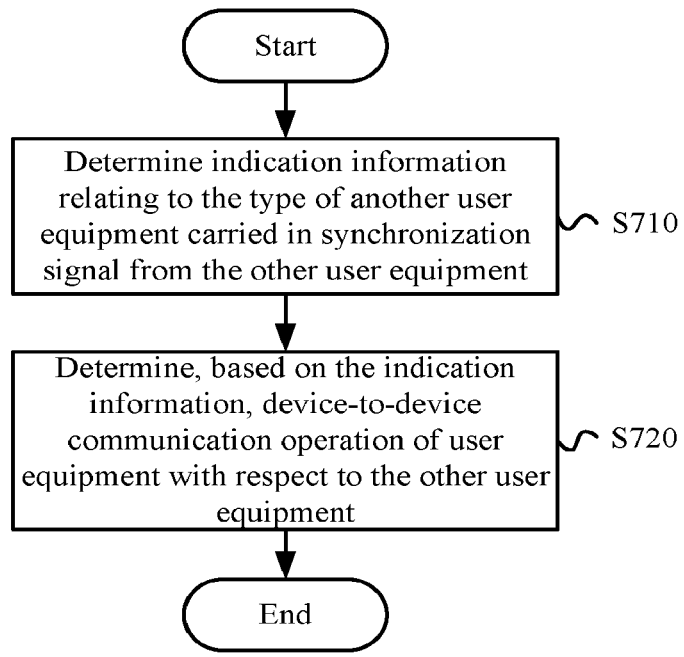
FIG. 7 is a flow chart illustrating a process example of a wireless communication method for user equipment side according to an embodiment of the present disclosure.

As shown in FIG. 7, at step S710, indication information relating to the type of another user equipment carried in a synchronization signal from the other user equipment is determined. The type includes a first type and a second type. As described above, the first type and the second type may have different specific meanings depending on specific applications, and may include, for example, a relaying party and a relayed party among D2D devices, a party providing a synchronization reference and a party not providing a synchronization reference in a D2D communication, the priority of communication content transmitted in a D2D communication, or the like. In addition, the number of the determined types may be more than two.

In step S720, a device-to-device communication operation of the user equipment with respect to the other user equipment is determined based on the indication information. Accordingly, the D2D communication operation may include, for example, whether to request to access to a relay device or whether to accept an access request of a relayed device, whether to synchronize with a party serving as a synchronization reference, whether to preferentially transmit or receive communication content having a high priority, or the like.

The device and method according to the embodiments of the present disclosure are described above from the perspective of a discovered party in a D2D communication (i.e., the party receiving a D2D discovery signal, such as a CUE). Next, a device and a method according to embodiments of the present disclosure are described from the perspective of a discovering party in a D2D communication (i.e., a party transmitting a D2D discovery signal, such as a PUE).

Figure 8:
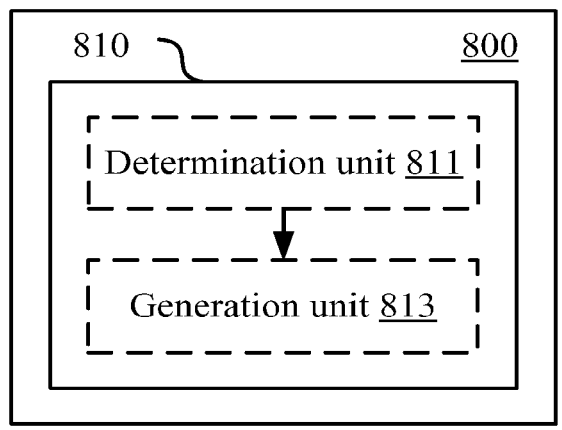
FIG. 8 is a block diagram illustrating a configuration example of a wireless communication device for user equipment side according to an embodiment of the present disclosure.

FIG. 8 shows a configuration example of a wireless communication device for user equipment side according to an embodiment of the present disclosure. The wireless communication device 800 includes at least one processor 810.

The processor 810 (the determination unit 811) is configured to determine a device-to-device communication requirement of a user equipment and the type of the user equipment. The type may include a first type and a second type.

Specifically, a second type device of the second type can obtain a communication service through the relay of a first type device of the first type in a device-to-device communication. Alternatively, a first type device of the first type can be used as a synchronization reference for a second type device of the second type in a device-to-device communication. Alternatively, device-to-device communication content transmitted by a first type device of the first type has a higher priority than communication content transmitted by a second type device of the second type.

The processor 810 (the generation unit 813) is further configured to generate a synchronization signal for a device-to-device communication based on the type of the user equipment. The synchronization signal carries indication information relating to the type of the user equipment.

According to an embodiment, root indexes corresponding to synchronization signal sequences contained in synchronization signals generated by different types of user equipments belong to different sets. Thus, the user equipment receiving the synchronization signal can determine the type of the user equipment that transmits the synchronization signal based on the set to which the root index belongs and determine a corresponding D2D communication operation. For example, as listed in the previous example, the PSS root index of a. PUE can be set to {25}, the PSS root index of a CUE can be set to one of {29, 34}. Alternatively, the PSS root index of a PUE can be set to one of {25, 26}, and the PSS root index of a CUE can be set to one of {29, 34, 37}, Of course, these examples are merely illustrative and not restrictive.

In addition, in a case where the user equipment is located outside the coverage of the serving base station, the processor 810 may be configured to select a root index from a root index set corresponding to the type of the user equipment and generate the synchronization signal of the user equipment based on the root index. It should be noted that, although in the scenario described above in conjunction with the specific example, the user equipment such as the PUE which is to transmit the synchronization signal needs to be located within the network coverage so as to be able to provide relay for another user equipment, in other scenarios, a user equipment that can provide a synchronization reference for another user equipment or a user equipment that is to provide communication content with a high priority to another device may perform device discovery when located outside the coverage of the serving base station.

On the other hand, in a case where the user equipment is located within the coverage of the serving base station, the processor 810 may be configured to generate activation request information for requesting the serving cell to provide the user equipment with information regarding the root index.

The activation request information may be generated in accordance with a user instruction and may include a device identification of the user equipment, a connection type of the user equipment (e.g., whether the user equipment can provide relay to a cellular network or a relay to a WiFi, etc.), the location information of the user equipment, and the like. Such information may be used, for example, by a base station to update the user equipment information table maintained by the base station, to perform number control of a certain type of user equipments such as PUEs, or may be used for the base station-assisted device discovery, etc.

In addition to the information listed above, the activation request information may also include, for example: (1) a communication service type configured by the user equipment; (2) the network connection quality information corresponding to the service type; (3) the access authorization, and on the like. For example, for the above relay application scenario (or the synchronization reference application), the access authorization of the user equipment serving as the PUE (or the referenced UE) may include, for example, open access and closed access. In the case where the access authorization is configured to be the open access, any CUE can access to the PETE. In the case where the access authorization is configured to be the closed access, the CUE access is restricted. The PUE can determine whether a CUE is authorized to access according to; for example, the stored access permission list. A CUE which is not included in the list can not access to the PUE. In the above information, the information (1) and (2) may be used, for example, to support decision at base station side. The information (1) and (3)

may be used, for example, by the base station to select the user equipment to offload, where the base station performs the offload by relying mainly on a master device which is open and connected to WiFi.

As described above, for example, in the scenario of providing a relay service, the activation request information to be transmitted to the base station by a user equipment to serve as a PUE may include information about the service quality of the communication service obtained by the user equipment. Correspondingly, according to an embodiment, the processor 810 may be configured to estimate service quality of the communication service obtained by the user equipment and embed the estimated service quality in the activation request information.

In addition, corresponding to the above-mentioned case of the closed access, according to an embodiment, the processor 810 may be configured to determine, in response to the access request information from another user equipment and according to a predetermined list of slave devices, whether to take the other user equipment as a served slave device.

In addition, the generated activation request information is embedded in the radio resource control (RRC) signaling to be transmitted to the base station.

As previously mentioned, the above synchronization signal may be transmitted on an unauthorized frequency band, and the synchronization signal sequence may reuse the synchronization signal sequence for the cell. Correspondingly, according to an embodiment, the processor 810 (the generation unit 813) may be configured to generate a synchronization signal for use on an unauthorized frequency band, and the root index corresponding to the synchronization signal sequence contains a root index corresponding to a synchronization signal sequence for the cell. As described above, since the cell does not transmit the synchronization signal on the unauthorized frequency band, the UE can carry the information for the D2D communication on the unauthorized frequency band by reusing the cell resource.

Next, a specific example of a PUE activation process will be described with reference to FIG. 9. It is to be noted that the specific details described in the following examples are merely illustrative and not restrictive.

First, it is to be noted that, the UE may be activated to be a PUE according to the wish of the user, to achieve the effect of network offload to a certain extent while the service requirements of the UE are met. This feature is more obvious in the case of cross-operators. Some possible application scenarios is listed in the following:

Example Scenario 1: a user A and a user B are friends, but devices of the user A and the user B belong to different operators. When the user A and the user B move to a certain location, the user A can access to the network and have good service quality, but the user B cannot access to the network or have poor service quality. The user A can activate the device to become a PUE to share the network connection with the user B.

Example Scenario 2: a user C has multiple devices belonging to different operators. When some of the devices have poor connection quality or the data traffic is exhausted, the user C can activate a UE with good connection quality to achieve network sharing, or user experiences can be maintained consistent among multiple devices in this manner.

Figure 9:
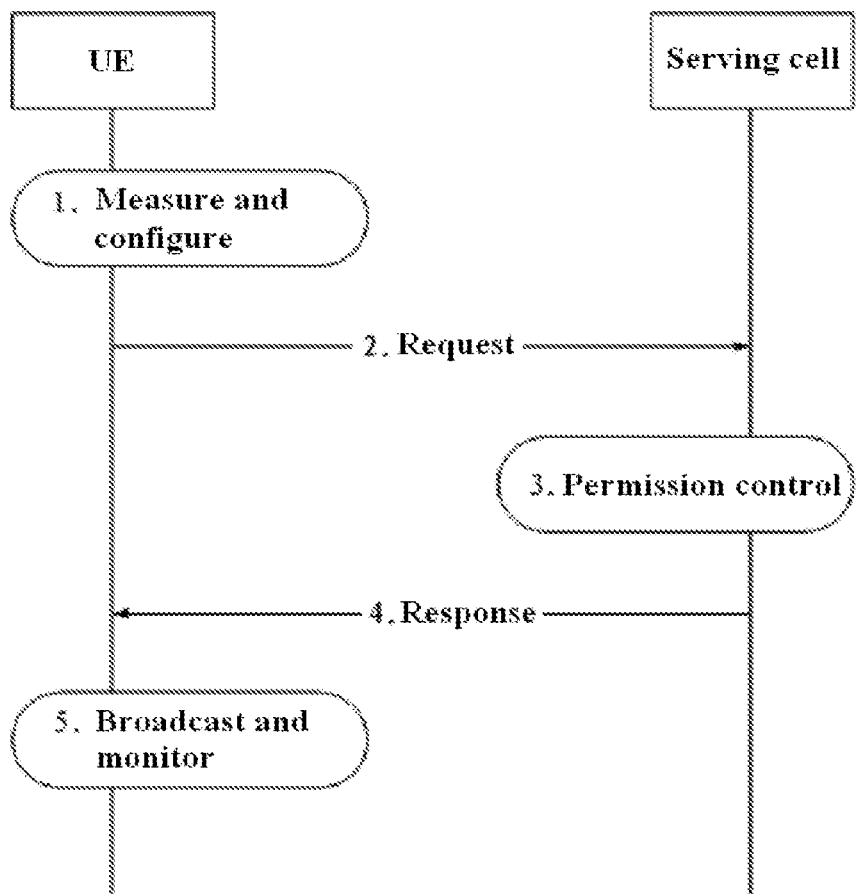
FIG. 9 is a schematic diagram illustrating an example of a communication procedure between a user equipment and a serving cell when the user equipment performs an activation request to the serving cell according to an embodiment.

An example of activation process of the PUE is shown in FIG. 9.

At step 1, before transmitting a PUE activation request, the UE needs to measure and configure some necessary parameters, including, for example:

a) configuring the access authorization of the UE as a PUE, including the previously mentioned open access and closed access. When configured to be the open access, any CUE can access to the PUE. When configured to be the closed access, the CUE access is restricted, and the PUE determines whether a CUE is authorized to access according to, for example, the stored access permission list or a password;

b) configuring the PUE type according to the network connection type thereof. For example, when connected to the internet via a cellular network, the UE may correspond to the first type RUE; and when connected to the internet via a WiFi, the UE may correspond to the second type PUE;

c) measuring a reference signal receiving power (RSRP) or a received signal strength indication (RSSI). In the case where the UE is configured to be the first type, the RSRP can be measured. In the case where the UE is configured to be the above second type, the RSSI can be measured.

Next, at step 2, the UE transmits the PUE activation request information to the serving cell through, for example, RRC signaling. The PUE activation request information may include, for example, the UE ID, the configured PUE type, and the corresponding measured RSRP/RSSI.

At step 3, the serving cell performs permission control and makes a response according to the received request. Since the process is performed at base station side, the process will be described later in further detail in conjunction with the embodiment of base station side.

At step 4, if the request is accepted, the serving cell transmits the activation request response information to the UE via, for example, RRC signaling or downlink control information. The information includes, for example, the PUE ID assigned to the UE.

At step 5, after reception of the request response information, the UE is activated to be a PUE which can, for example, periodically broadcast the PUE discovery information on an unauthorized frequency band to support the CUE to perform PUE discovery and detection.

The process of device discovery process between the PUE and the CUE, including the PUE discovery information broadcasting and the monitoring process, is described above in conjunction with specific examples, and is not repeated here.

Next, a configuration example of a wireless communication device for user equipment side according to another embodiment of the present disclosure will be described with reference to FIG. 10.

Figure 10:
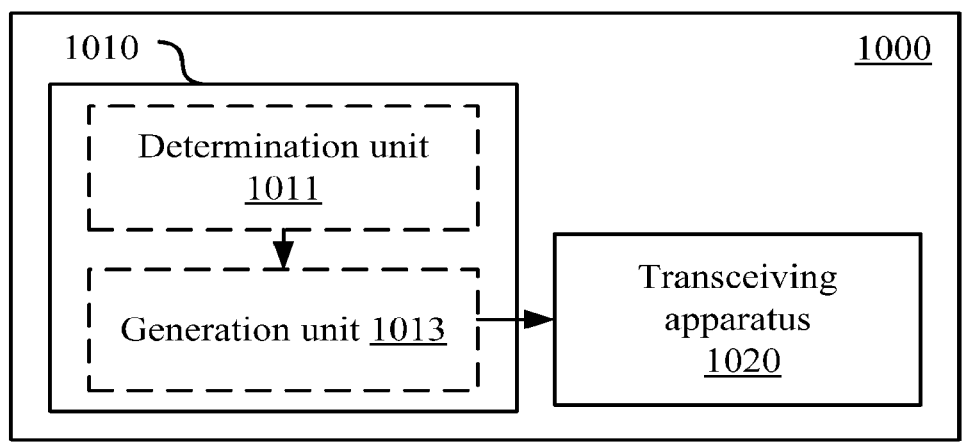
FIG. 10 is a block diagram illustrating a configuration example of a wireless communication device for user equipment side according to another embodiment.

As shown in FIG. 10, a wireless communication device 1000 includes at least one processor 1010 and a transceiving apparatus 1020. The processor 1010 (including a determination unit 1011 and a generation unit 1013) may have a configuration similar to the processor 810 (including the determination unit 811 and the generation unit 813) described above. The transceiving apparatus 1020 is configured to transmit the synchronization signal generated by the generation unit 1013 on the unauthorized frequency band and detect the synchronization signal of another user equipment.

The transceiving apparatus 1020 may be configured to perform the transmission of the generated synchronization signal and the detection of the synchronization signal of the other user equipment at a predetermined time interval, for example, as previously described with reference to FIGS. 3 and 4. However, embodiments of the present disclosure are not limited to the specific details involved in the foregoing examples, such as specific timing settings.

Next, a process example of a wireless communication method for user equipment side according to an embodiment of the present disclosure will be described without repeating the specific details of the above description.

Figure 11:
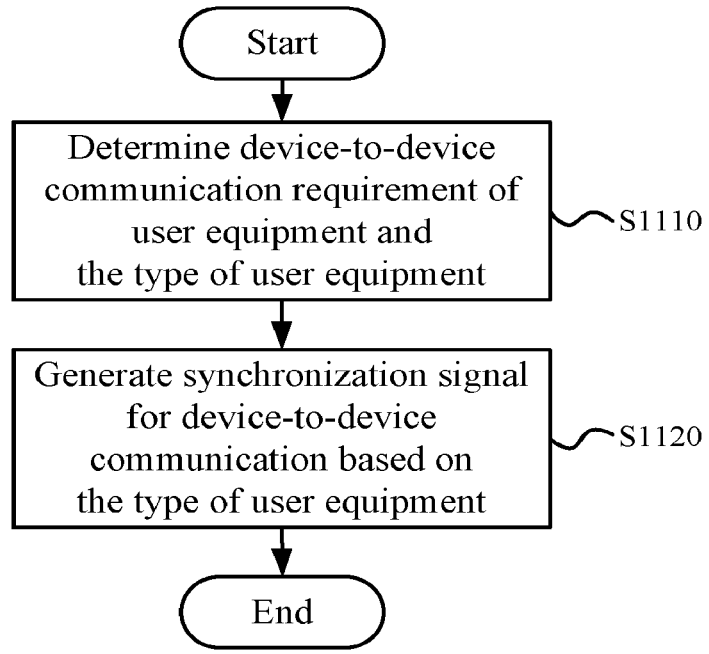
FIG. 11 is a flow chart illustrating a process example of a wireless communication method for user equipment side according to another embodiment of the present disclosure.

As shown in FIG. 11, the wireless communication method performed at user equipment side according to an embodiment includes a step S1110 of determining a device-to-device communication requirement of the user equipment and the type of the user equipment. The type may include a first type and a second type. As described above, the first type and the second type may have different specific meanings, and may include, for example, a relaying party and a relayed party among D2D devices, a party providing a synchronization reference and a party not providing a synchronization reference in a D2D communication, the priority of the communication content transmitted in a D2D communication, or the like. In addition, the number of determined types may be more than two.

The method further includes a step S1120 of generating a synchronization signal for device-to-device communication based on the type of the user equipment. The synchronization signal carries indication information relating to the type of the user equipment.

Thus, another user equipment receiving the synchronization signal can determine the corresponding communication operation based on the information relating to the type carried in the synchronization signal without requiring additional information interaction.

The wireless communication device and the wireless communication method for user equipment side according to embodiments of the present disclosure are described above. Embodiments of the present disclosure also include a wireless communication device for base station side. Next, a wireless communication device for base station side according to an embodiment of the present disclosure will be described with reference to FIG. 12.

Figure 12:
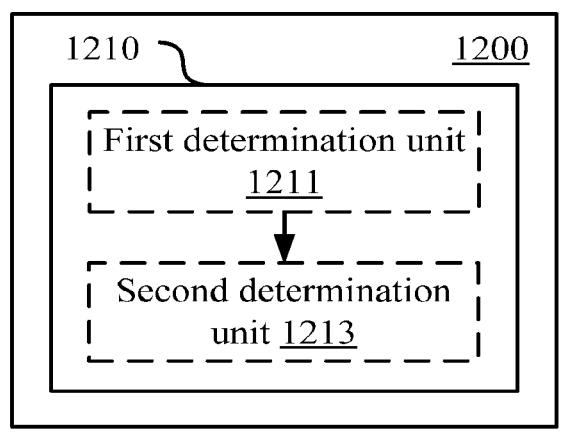
FIG. 12 is a block diagram illustrating a configuration example of a wireless communication device for base station side according to another embodiment of the present disclosure.

As shown in FIG. 12, a wireless communication device 1200 includes at least one processor 1210 configured to determine the type of a user equipment served by the base station (the first determination unit 1211). The type includes a first type and a second type.

The processor 1210 is also configured to determine for the user equipment, based on the type of the user equipment, information relating to a root index corresponding to a synchronization signal sequence available to the user equipment (the second determination unit 1213). Root indexes of synchronization signals available to the user equipments of different types belong to different sets.

As mentioned previously, the synchronization signal sequence may be obtained by reusing the synchronization signal sequence for the cell. More specifically, the UE may carry information for the D2D communication by reusing the cell resources such as PCI, for example, for indicating the type of the UE. Correspondingly, the information relating to the root index corresponding to the synchronization signal sequence determined by the second determination unit 1213 may be PCI.

According to an embodiment, the processor 1210 may be configured to determine, based on the type of the user equipment, information relating to the root index for a user equipment operating on an unauthorized frequency band. The root index corresponding to the synchronization signal sequence may contain a root index corresponding to the synchronization signal sequence for the cell.

In addition, in the case where the user equipment is to perform D2D communication using an unauthorized frequency band, the unauthorized frequency band to be used for D2D communication may be determined by the base station. Correspondingly, according to an embodiment, the processor 1210 is further configured to determine the unauthorized frequency band to be used for the D2D communication between the user equipments. However, as previously mentioned, the unauthorized frequency band for the D2D communication may also be agreed on in advance or set to default, in which case it is unnecessary for the base station to determine the unauthorized frequency band. However, the base station may be configured to dynamically adjust the default frequency band configuration described above. The base station may inform the user equipment of the determined unauthorized frequency band or the adjusted default frequency band through the broadcast information.

As described above in the description with respect to the embodiments of user equipment side, the user equipment may request to be a PUE or a CUE to the serving cell. Correspondingly, in the wireless communication device for base station side according to the present embodiment, the processor 1210 may be configured to designate a user equipment as a master device or a slave device based on the activation request information from the user equipment, where the slave device obtains a communication service through the relay of the master device during a device-to-device communication.

On the other hand, the wireless communication device for base station side according to the embodiment of the present disclosure may also designate the user equipment as a master device or a slave device according to the network load. This situation corresponds to the previously described triggering an activation request for the master device and the slave device based on network offload requirements.

Specifically, when the base station needs to offload some UEs in the form of CUEs to a PUE in the cell which is connected to the WiFi and the access authorization of which is configured to be the open access, an exemplary operation may be performed.

At step 1, the base station selects the UE to be offloaded based on the PUT location and type information in the UE information maintained by the base station.

At step 2, a CUE ID is assigned to the selected LIE.

At step 3, the assigned CUE ID and information of a PUE (such as a PUE ID) within a certain distance from the UE is transmitted to the UE.

At step 4, the UE is activated to be a CUE and is enabled to monitor e discovery signal broadcasted by the PUE on the unauthorized frequency band.

The wireless communication device for base station side according to the embodiment of the present disclosure may determine whether the user equipment issuing a request is designated as the master device or the slave device according to a predetermined condition, based on either the user request or the network load.

For example, the determination of whether to designate a user equipment that requests to be a master device as a master device may be based on one or more of the following aspects:

a) whether the serving cell and the user equipment requesting to be the master device are authorized to share the frequency band;

b) the number of master devices which already exist in the serving cell; and c) the service quality of the communication service obtained by the user equipment requesting to be the master device.

Regarding the condition a), the shared frequency band is, for example, an unauthorized frequency band which is designated or agreed on for a D2D communication, and the user equipment is allowed to be the master device only if the user equipment is authorized to use the shared frequency band. For the condition b), a new user equipment is allowed to be the master device only if the number of the master devices already existing in the cell does not reach a predetermined threshold. For the condition c), the user equipment requesting to be the master device is allowed to be the master device only if the quality of the communication service of the user equipment requesting to be the master device is higher than a predetermined level.

In addition, corresponding to the scenario of the previously mentioned network offload, according to an embodiment, the processor 1210 may be configured to determine at least one user equipment as a slave device in the case where the network load exceeds a predetermined level. The slave device obtains a connection to the WiFi through the relay of another user equipment serving as a master device. In this way, the load of the cellular network may be reduced, thereby achieving network offloading.

Next, a process example of the permission control performed by the wireless communication device for base station side according to an embodiment of the present disclosure with respect to the request to be a master device from the user equipment will be described with reference to FIG. 13. The process example may correspond to step 3 in the example described above with reference to FIG. 9.

Figure 13:
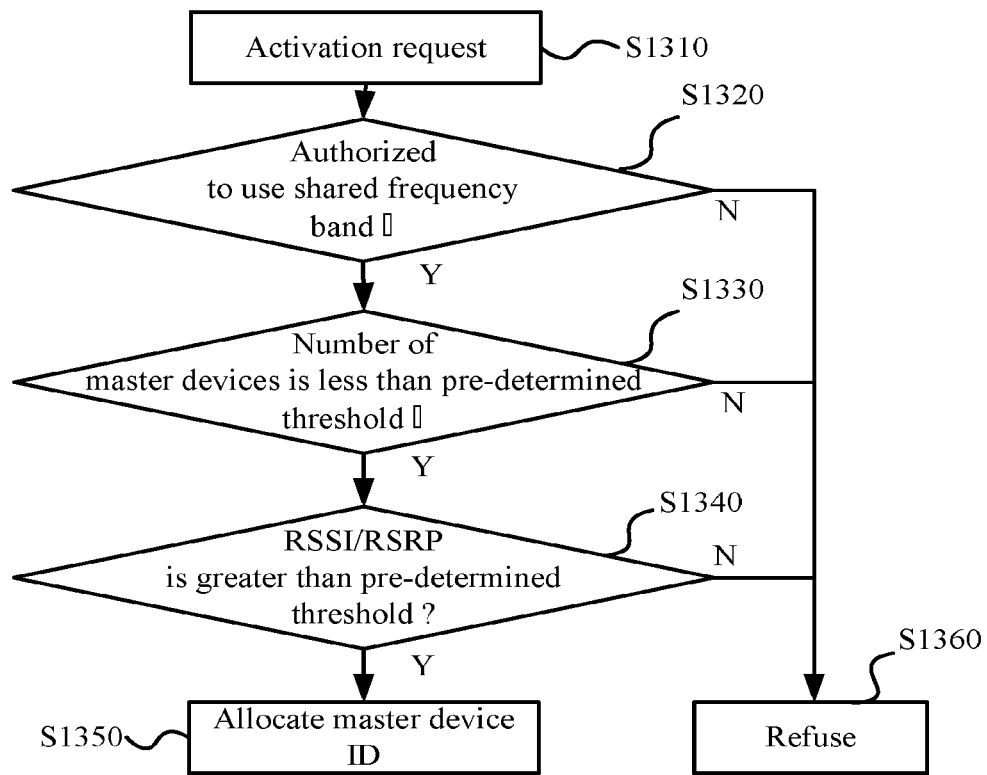
FIG. 13 is a flow chart illustrating a process of an activation request for a user equipment performed by a wireless communication device for a base station side according to an embodiment.

As shown in FIG. 13, the confirmation of usage authorization of the shared frequency band is started at step S1310 based on a master device activation request from a user equipment.

At step S1320, it is determined whether the current cell and the UE are authorized to share the frequency band. If the current cell and the UE are authorized to share the frequency band, the method proceeds to the next step; and if the current cell and the UE are not authorized to share the frequency band, the request is refused.

At step S1330, assuming that N1 is the maximum number of PUEs which are allowed to exist at the same time which is pre-configured for the cell, after the serving cell receives the PUE activation request information, the method proceeds to the next step if the number of currently existing PUEs is less than N1, otherwise, the request is refused.

At step S1340, if RSRP≥P1 or RSSI≥P2, the method proceeds to the next step, otherwise, the request is refused, where the predefined threshold P1 indicates the minimum RSRP value acceptable in the case where the UE is configured as the first type PUE, and P2 is the minimum RSSI value acceptable in the case where the LIE is configured as the second type PUE.

In the case where the UE issuing the request satisfies the above condition, the master device ID may be allocated at S1350, otherwise, the request of the user equipment is refused at step S1360. In the case of accepting the request of the user equipment, the base station may also update the user equipment information such as a PUE information table maintained by the base station.

It should be noted that although the determination processes of steps S1320 to S1340 is successively performed in the example of FIG. 13, the above determination can be made in parallel. In addition, in the case where it is only necessary to perform the determination based on a part of the above-described conditions, some of the condition determination processes described above may be omitted.

Figure 14:
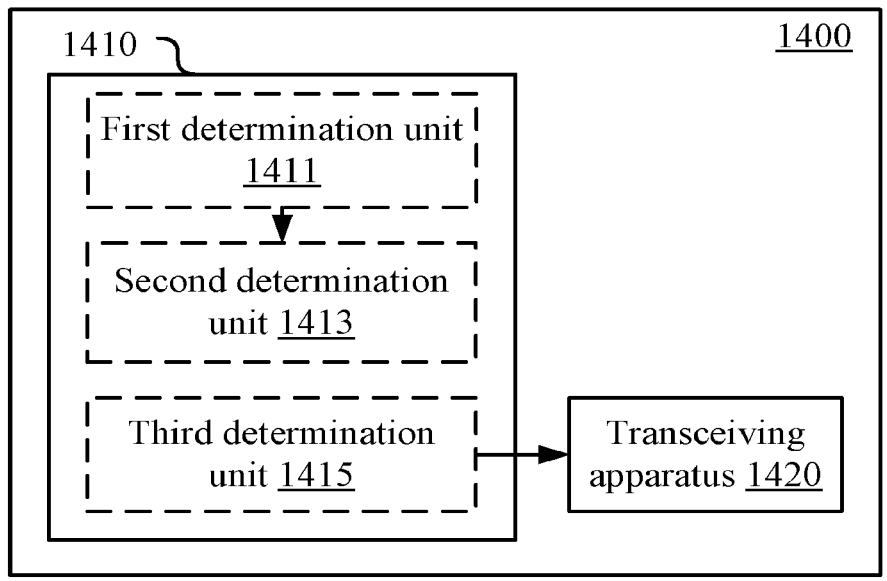
FIG. 14 is a block diagram illustrating a configuration example of a wireless communication device for base station side according to another embodiment.

Next, a wireless communication device for base station side according to another embodiment will be described with reference to FIG. 14. As shown in FIG. 14, the wireless communication device 1400 includes at least one processor 1410 and a transceiving apparatus 1420. The processor 1410 includes the first determination unit 1411, the second determination unit 1413, and the third determination unit 1415. Configurations of the first determination unit 1411 and the second determination unit 1413 are similar to that of the first determination unit 1211 and the second determination unit 1213 described above with reference to FIG. 12. The third determination unit 1415 is configured to determine an unauthorized frequency band to be used for the device-to-device communication between the user equipments. The transceiving apparatus 1420 is configured to inform the user equipments of the determined unauthorized frequency band through the broadcast information.

Figure 18:
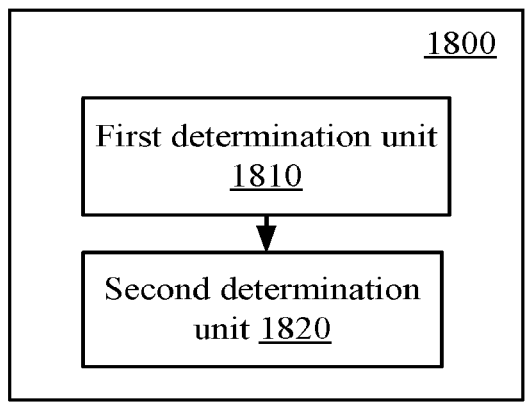
FIG. 18 is a block diagram illustrating a configuration example of a wireless communication device for user equipment side according to an embodiment of the present disclosure.
Figure 19:
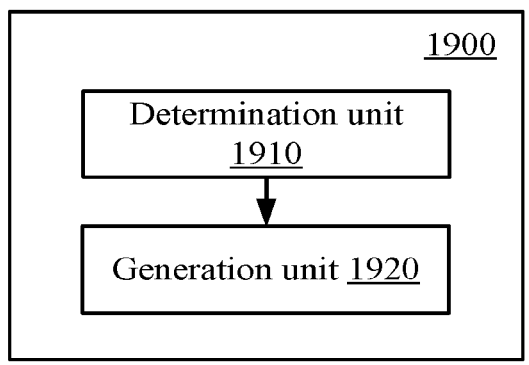
FIG. 19 is a block diagram illustrating a configuration example of a wireless communication device for user equipment side according to another embodiment of the present disclosure.
Figure 20:
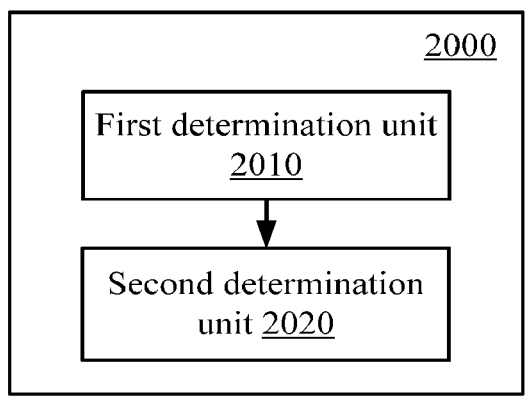
FIG. 20 is a block diagram illustrating a configuration example of a wireless communication device for base station side according to an embodiment of the present disclosure.

FIG. 18 to FIG. 20 show configuration examples of a wireless communication device for user equipment side and a wireless communication device for base station side according to an embodiment of the present disclosure, respectively.

As shown in FIG. 18, a wireless communication device 1800 for user equipment side according to an embodiment includes a first determination unit 1810 and a second determination unit 1820. The first determination unit 1810 is configured to determine indication information relating to the type of another user equipment carried in a synchronization signal from the other user equipment. The type includes a first type and a second type. The second determination means 1820 is configured to determine, based on the indication information, a device-to-device communication operation of the user equipment 1800 with respect to the other user equipment.

As shown in FIG. 19, a wireless communication device 1900 for user equipment side according to another embodiment includes a determination unit 1910 and a generation unit 1920. The determining unit 1910 is configured to determine a device-to-device communication requirement of the user equipment 1900 and the type of the user equipment 1900. The type includes a first type and a second type. The generation unit 1920 is configured to generate a synchronization signal for a device-to-device communication based on the type of user equipment 1900. The synchronization signal carries indication information relating to the type of user equipment 1900.

As shown in FIG. 20, a wireless communication device 2000 for base station side according to another embodiment includes a first determination unit 2010 and a second determination unit 2020. The first determination unit 2010 is configured to determine the type of a user equipment served by the base station. The type includes a first type and a second type. The second determination unit 2020 is configured to determine for the user equipment, based on the type of the user equipment, information relating to a root index corresponding to a synchronization signal sequence available to the user equipment. Root indexes of synchronization signals available to different types of user equipments belong to different sets.

By way of example, the various steps of the method described above and the various constituent modules and/or units of the above described devices may be implemented as software, firmware, hardware, or a combination thereof. In the case of implementing through software or firmware, a program for constituting the software for implementing the above-described method may be installed from a storage medium or a network to a computer having a dedicated hardware structure (for example, the general-purpose computer 1500 shown in FIG. 15), which can perform various functions when various programs are installed therein.

Figure 15:
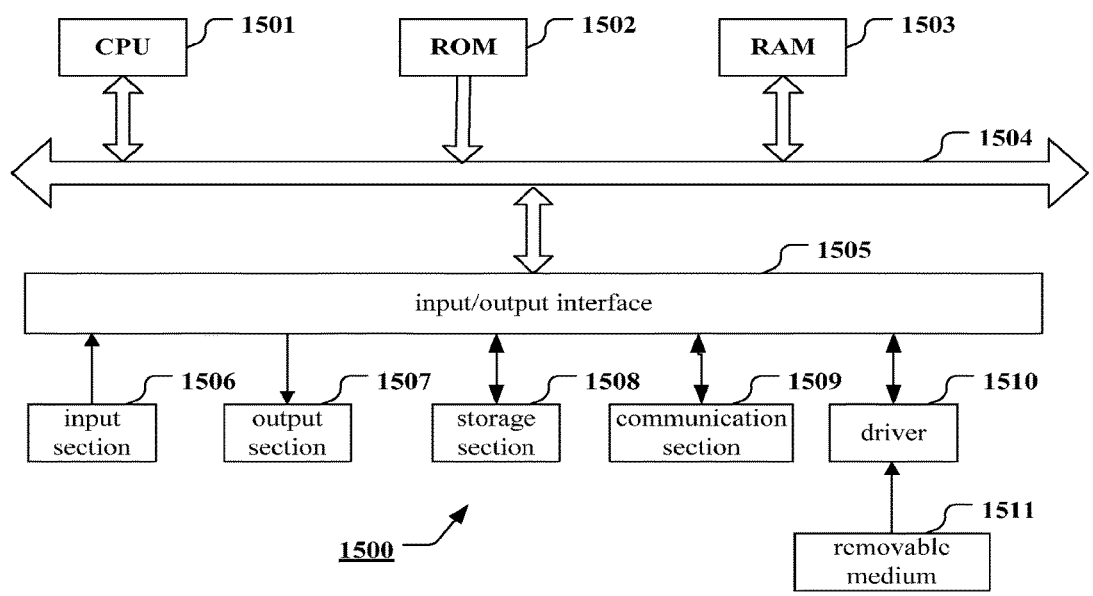
FIG. 15 is a block diagram illustrating an exemplary structure of a computer implementing the method and the device of the present disclosure.

In FIG. 15, the central processing unit (i.e., the CPU) 1501 performs various processes according to a program stored in the read only memory (ROM) 1502 or a program loaded from the storage section 1508 to the random access memory (RAM) 1503. In the RAM 1503, data necessary for the CPU 1501 to perform various processes or the like is also stored as necessary. The CPU 1501, the ROM 1502, and the RAM 1503 are linked to each other via the bus 1504. The input/output interface 1505 is also linked to the bus 1504.

The following components are linked to the input/output interface 1505: an input section 1506 (including a keyboard, a mouse, etc.), an output section 1507 (including a display such as a cathode ray tube (CRT), a liquid crystal display (LCD), and a speaker), a storage section 1508 (including a hard disk, etc.), a communication section 1509 (including a network interface card such as a LAN card, a modem). The communication section 1509 performs communication processing via a network such as the Internet. The driver 1510 may also be linked to the input/output interface 1505 as necessary. The removable media 1511, such as a magnetic disk, an optical disk, a magneto-optical disk, a semiconductor memory, are mounted on the driver 1510 as necessary so that the computer program read therefrom is installed in the storage section 1508 as necessary.

In the case where the above series of processes are implemented by software, a program constituting the software is installed from a network such as the Internet or a storage medium such as the removable medium 1511.

It will be understood by those skilled in the art that such a storage medium is not limited to the removable medium 1511 in which a program is stored and which is distributed separately from the device to provide a program to the user as shown in FIG. 15. An example of the removable medium 1511 includes a magnetic disk (including a floppy disk (registered trademark)), an optical disk (including a CD-ROM and a digital versatile disk (DVD)), a magneto-optical disk (including a mini-disk (registered trademark)) and a semiconductor memory. Alternatively, the storage medium may be a ROM 1502, a hard disk included in the storage section 1508, etc., in which programs are stored and distributed to the user along with the devices containing them.

Embodiments of the present disclosure also relate to a program product storing a machine-readable instruction code therein. The instruction code can perform the above-described method according to the embodiment of the present disclosure when the instruction code is read and executed by the machine.

Accordingly, a storage medium for carrying the above-described program product storing the machine-readable instruction code therein is also included in the present disclosure. The storage medium includes, but is not limited to, floppy disk, optical disk, magneto-optical disk, memory card, memory stick, and the like.

Embodiments of the present application also relate to the following electronic devices. In the case where the electronic device is used at base station side, the electronic device may be implemented as any type of evolved node B (eNB), such as macro eNB and small eNB. The small eNB may be an eNB that covers a cell smaller than the macro cell, such as the pico eNB, the micro eNB, and the home (femto) eNB. Instead, the electronic device may be implemented as any other type of base station, such as a NodeB and a base station transceiver station (BTS). The electronic device may include a body (also referred to as a base station device) configured to control wireless communication; and one or more remote radio headers (RRH) disposed at a location different from the body. In addition, the various types of terminals described below may operate as base stations by performing base station functions temporarily or semi-persistently.

In the case where the electronic device is used at user equipment side, the electronic device may be implemented as a mobile terminal (such as a smart phone, a tablet personal computer (PC), a notebook PC, a portable game terminal, a portable/dongle mobile router, and a digital camera) or a vehicle mounted terminal (such as a car navigation device). In addition, the electronic device may be a wireless communication module (such as an integrated circuit module including a single or multiple chips) installed on each of the above-described terminal.

[An Application Example of a Terminal Device]

Figure 16:
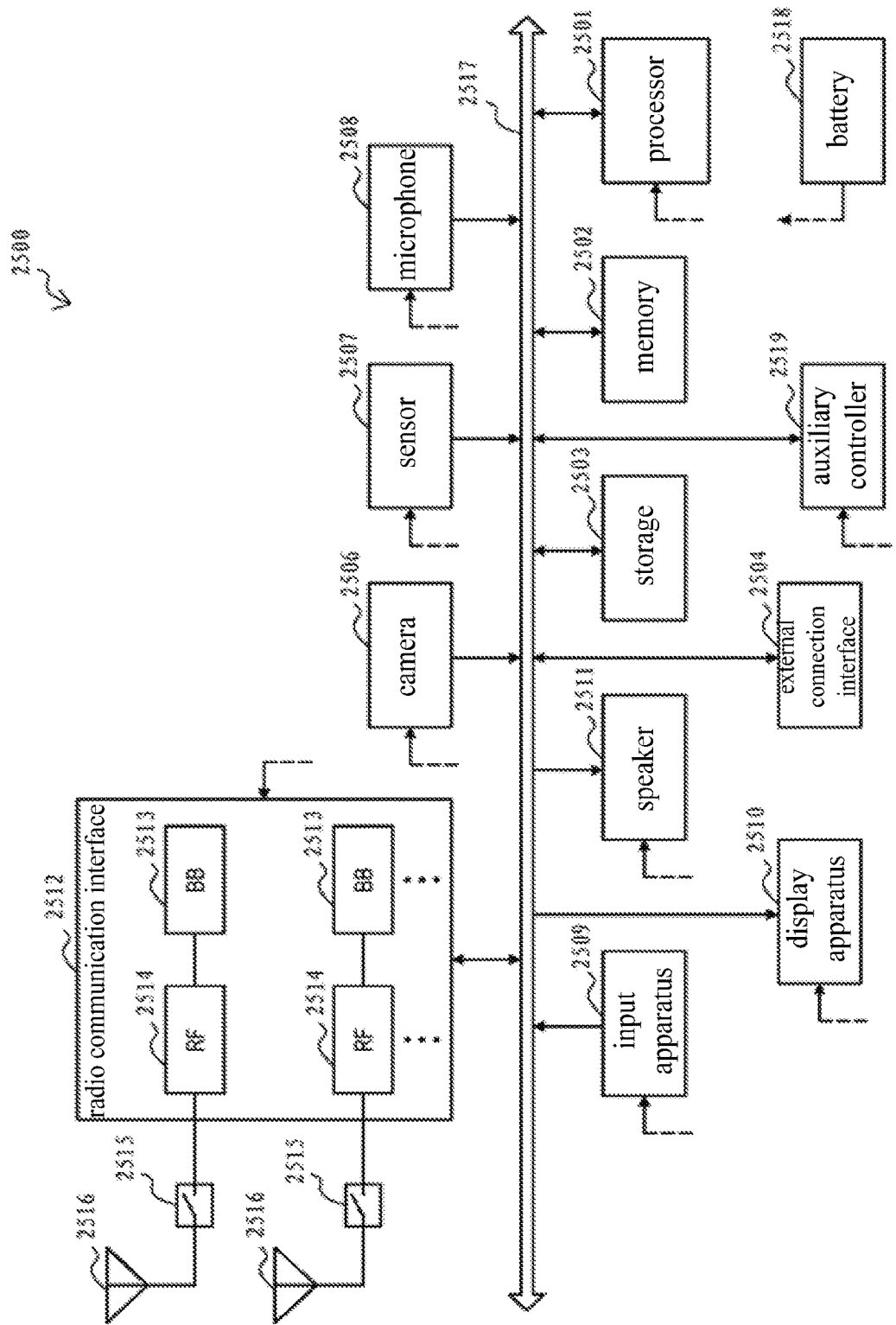
FIG. 16 is a block diagram illustrating an example of a schematic configuration of a smart phone to which the technique of the present disclosure can be applied.

FIG. 16 is a block diagram illustrating an example of a schematic configuration of a smartphone 2500 that may apply the techniques of the present disclosure. The smartphone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system-on-chip (SoC), and controls the functions of the application layer and the other layers of the smartphone 2500. The memory 2502 includes a RAM and a ROM, and stores data and programs executed by the processor 2501. The storage 2503 may include a storage medium, such as a semiconductor memory and a hard disk. The external connection interface 2504 is an interface for connecting an external device such as a memory card and a universal serial bus (USB) device to the smartphone 2500.

The camera 2506 includes an image sensor such as a charge coupled device (CCD) and a complementary metal oxide semiconductor (CMOS), and generates a captured image. The sensor 2507 may include a set of sensors, such as a measurement sensor, a gyro sensor, a geomagnetism sensor, and an acceleration sensor. The microphone 2508 converts the sound input to the smartphone 2500 into an audio signal. The input apparatus 2509 includes, for example, a touch sensor configured to detect a touch on the screen of the display apparatus 2510, a keypad, a keyboard, a button or a switch, and receives an operation or information input from the user. The display apparatus 2510 includes a screen, such as a liquid crystal display (LCD) and an organic light emitting diode (OLED) display, and displays an output image of the smartphone 2500. The speaker 2511 converts the audio signal output from the smartphone 2500 into sound.

The radio communication interface 2512 supports any cellular communication scheme such as LIE and LIE-advanced, and performs radio communication. The radio communication interface 2512 may typically include, for example, a BB processor 2513 and an RF circuit 2514. The BB processor 2513 may perform, for example, encoding/decoding, modulating/demodulating, and multiplexing/demultiplexing, and perform various types of signal processing for radio communication. Meanwhile, the RF circuit 2514 may include, for example, a mixer; a filter, and an amplifier; and transmits and receives a wireless signal via the antenna 2516. The radio communication interface 2512 may be a chip module on which the BB processor 2513 and the RF circuit 2514 are integrated. As shown in FIG. 16, the radio communication interface 2512 may include multiple BB processors 2513 and multiple RF circuits 2514. Although FIG. 16 illustrates an example in which the radio communication interface 2512 includes multiple BB processors 2513 and multiple RF circuits 2514, the radio communication interface 2512 may also include a single BB processor 2513 or a single RF circuit 2514.

In addition, in addition to the cellular communication scheme, the radio communication interface 2512 may support other types of wireless communication schemes such as a short-range wireless communication scheme, a near-field communication scheme, and a wireless local area network (LAN) scheme. In this case, the radio communication interface 2512 may include a BB processor 2513 and an RF circuit 2514 for each wireless communication scheme.

Each of the antenna switches 2515 switches the connection destination of the antenna 2516 between multiple circuits included in the radio communication interface 2512, such as circuits for different wireless communication schemes.

Each of the antennas 2516 includes a single or multiple antenna elements, such as multiple antenna elements included in the MIMO antenna, and for the radio communication interface 2512 to transmit and receive wireless signals. As shown in FIG. 16, the smartphone 2500 may include multiple antennas 2516. Although FIG. 16 illustrates an example in which the smartphone 2500 includes multiple antennas 2516, the smartphone 2500 may also include a single antenna 2516.

In addition, the smartphone 2500 may include an antenna 2516 for each wireless communication scheme. In this case, the antenna switch 2515 may be omitted from the configuration of the smartphone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 with each other. The battery 2518 supplies power to the individual blocks of the smartphone 2500 shown in FIG. 16 via a feeder line, which is shown in part as a dotted line in the figure. The auxiliary controller 2519 operates the minimum required function of the smartphone 2500, for example, in the sleep mode.

In the smartphone 2500 shown in FIG. 16, the transceiving apparatus 520, 1020 described with reference to FIGS. 5 and 10 may be implemented by the radio communication interface 2512. At least a portion of the functions of the units described with reference to FIGS. 1, 5, 8 and 10 may also be implemented by the processor 2501 or the auxiliary controller 2519. For example, the power consumption of the battery 2518 may be reduced by performing a part of the functions of the processor 2501 by the auxiliary controller 2519. In addition, the processor 2501 or the auxiliary controller 2519 may perform at least a portion of the functions of the units described with reference to FIGS. 1, 5, 8, and 10 by executing a program stored in the memory 2502 or the storage 2503.

[An Application Example of a Base Station]

Figure 17:
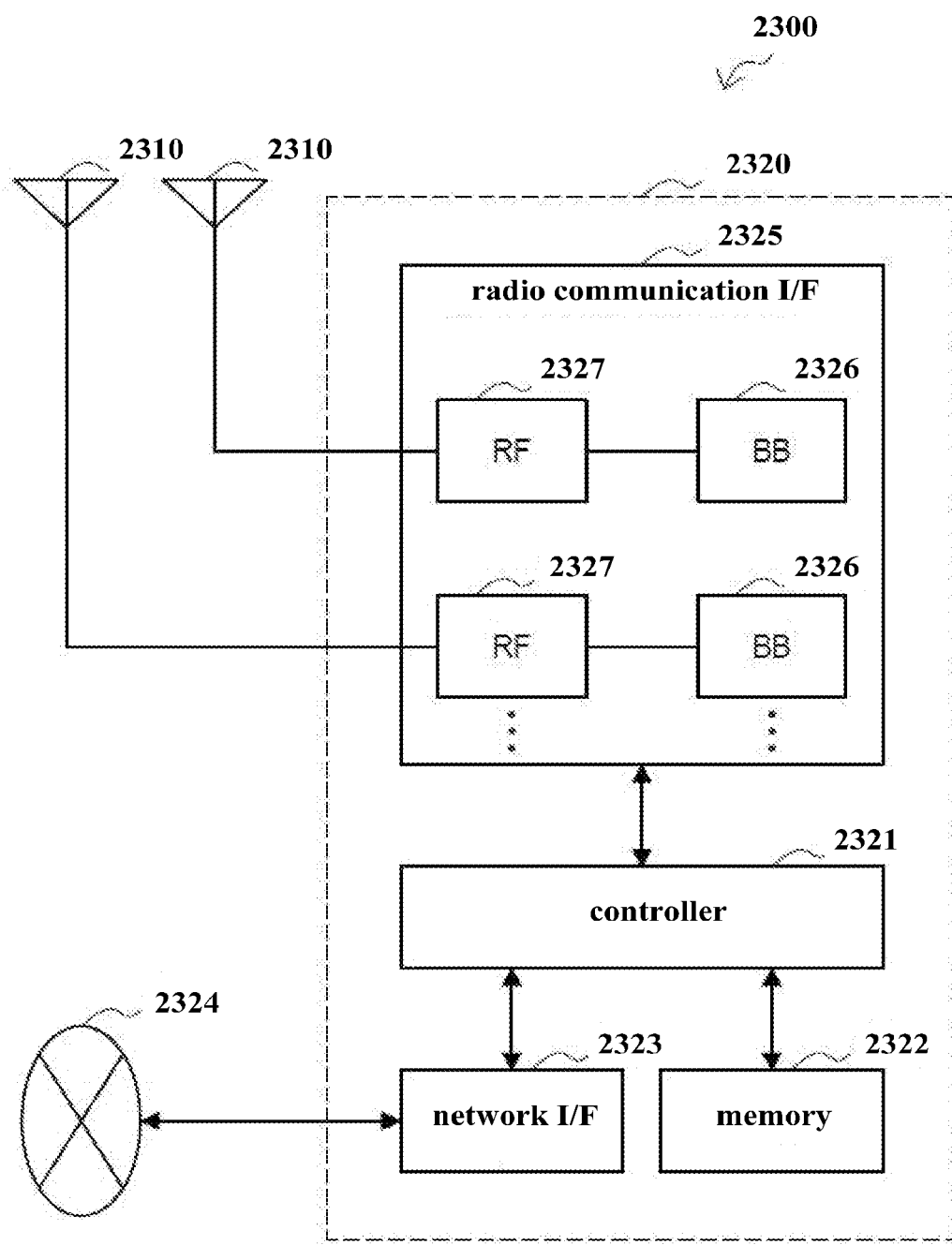
FIG. 17 is a block diagram illustrating an example of a schematic configuration of an eNB (evolved Base station) to which the technique of the present disclosure can be applied.

FIG. 17 is a block diagram illustrating an example of a schematic configuration of an eNB that can apply the techniques of the present disclosure. The eNB 2300 includes one or more antennas 2310 and a base station device 2320. The base station device 2320 and each antenna 2310 may be connected to each other via an RF (radio frequency) cable.

Each of the antennas 2310 includes a single or multiple antenna elements, such as multiple antenna elements included in a multiple-input multiple-output (MIMO) antenna, and for the base station device 2320 to transmit and receive wireless signals. As shown in FIG. 17, the eNB 2300 may include multiple antennas 2310. For example, the multiple antennas 2310 may be compatible with multiple frequency bands used by the eNB 2300. Although FIG. 17 illustrates an example in which the eNB 2300 includes multiple antennas 2310, the eNB 2300 may also include a single antenna 2310.

The base station device 2320 includes a controller 2321, a memory 2322, a network interface 2323, and a radio communication interface 2325.

The controller 2321 may be, for example, a CPU or a DSP, and operate various functions of the higher layer of the base station device 2320. For example, the controller 2321 generates a data packet based on the data in the signal processed by the radio communication interface 2325 and communicates the generated packet via the network interface 2323. The controller 2321 may bundle data from multiple baseband processors to generate bundled packets and communicate the generated bundled packets. The controller 2321 may have a logic function that performs, for example, radio resource control, wireless bearer control, mobility management, admission control, and scheduling. The control may be implemented in conjunction with a nearby eNB or core network node. The memory 2322 includes a RAM and a ROM, and stores programs executed by the controller 2321 and various types of control data (such as terminal list, transmission power data, and scheduling data).

The network interface 2323 is a communication interface for connecting the base station device 2320 to the core network 2324. The controller 2321 may communicate with the core network node or another eNB via the network interface 2323. In this case, the eNB 2300 may be connected to the core network node or other eNBs through logical interfaces such as the S1 interface and the X2 interface. The network interface 2323 may also be a wired communication interface or a radio communication interface for a wireless backhaul line. If the network interface 2323 is a radio communication interface, the network interface 2323 may use a higher frequency band for wireless communication than the frequency band used by the radio communication interface 2325.

The radio communication interface 2325 supports any cellular communication scheme, such as Long Term Evolution (LIE) and LIE-advanced, and provides a wireless connection to a terminal located in the cell of the eNB 2300 via the antenna 2310. The radio communication interface 2325 may typically include, for example, a baseband (BB) processor 2326 and an RF circuit 2327. The BB processor 2326 may perform, for example, encoding/decoding, modulating/demodulating, and multiplexing/demultiplexing, and perform various types of signal processing of the layers (e.g., L1, media access control (MAC), radio link control (RLC), and packet data aggregation protocols (PDCP)). Instead of the controller 2321, the BB processor 2326 may have a portion or all of the logic functions described above. The BB processor 2326 may be a memory for storing a communication control program or a module including a processor and a related circuit configured to execute a program. The update program may change the function of the BB processor 2326. The module may be a card or blade inserted into a slot of the base station device 2320. Alternatively, the module may also be a chip mounted on a card or blade. Furthermore, the RE circuit 2327 may include, for example, a mixer, a filter, and an amplifier, and transmits anti receives a wireless signal via the antenna 2310.

As shown in FIG. 17, the radio communication interface 2325 may include multiple BB processors 2326. For example, the multiple BB processors 2326 may be compatible with multiple frequency bands used by the eNB 2300. As shown in FIG. 17, the radio communication interface 2325 may include multiple RF circuits 2327. For example, the multiple RF circuits 2327 may be compatible with multiple antenna elements. Although FIG. 17 illustrates an example in which the radio communication interface 2325 includes multiple BB processors 2326 and multiple RF circuits 2327, the radio communication interface 2325 may also include a single BB processor 2326 or a single RF circuit 2327.

In the eNB 2300 shown in FIG. 17, the transceiving apparatus 1420 described with reference to FIG. 14 may be implemented by the radio communication interface 2325. At least a portion of the functions of the elements described with reference to FIGS. 12 and 14 may also be provided by a controller 2321. For example, the controller 2321 may perform at least a portion of the functions of the units described with reference to FIGS. 12 and 14 by executing a program stored in the memory 2322.

In the foregoing description of specific embodiments of the present disclosure, the features described and/or illustrated for one embodiment may be used in one or more other embodiments in the same or similar manner, combine with features in other embodiments, or replace features in other embodiments.

It should be emphasized that the term "comprising/including" as used herein refers to the presence of a feature, an element, a step or a component, but does not exclude the presence or addition of one or more other features, elements, steps or components.

In the above-described embodiments and examples, reference numerals including numbers are used to designate the respective steps and/or units. It will be understood by those of ordinary skill in the art that these reference numerals are for purpose of illustration and drawing and are not indicative of the order or any other limitations thereof.

In addition, the method of the present disclosure is not limited to being executed in the chronological order described in the specification, or may be executed in other chronological order, in parallel or independently. Therefore, the order of execution of the method described in this specification does not limit the technical scope of the present disclosure.

While the present disclosure has been disclosed by way of illustration of specific embodiments of the disclosure, it is to be understood that all of the embodiments and examples described above are illustrative and not restrictive. Various modifications, improvements, or equivalents of the present disclosure may be devised by those skilled in the art within the spirit and scope of the appended claims. Such modifications, improvements, or equivalents shall also be construed as being included within the scope of the present disclosure.

The invention claimed is:

1. A wireless communication device for a user equipment, the wireless communication device comprising:
   at least one processor configured to
      determine indication information relating to a type of an other user equipment carried in a synchronization signal from the other user equipment, wherein the type comprises a first type and a second type;
      determine, based on the indication information, a device-to-device (D2D) communication operation of the user equipment with respect to the other user equipment, wherein D2D communication content transmitted by a device of the first type has a higher priority than D2D communication content transmitted by a device of the second type;
      determine a monitor timing, of the other user equipment based on the synchronization signal, for controlling transmission of access request information, the monitor timing being after a timing of the synchronization signal by a predetermined timing interval; and
      preferentially read data transmitted by the other user equipment in a case that the other user equipment is determined to be of the first type based on the indication information.

2. The wireless communication device according to claim 1, wherein the at least one processor is configured to
   determine, based on the synchronization signal, a synchronization signal sequence of the synchronization signal, and
   determine, based on a root index corresponding to the synchronization signal sequence, whether the other user equipment is of the first type or of the second type.

3. The wireless communication device according to claim 2, wherein
   the device of the second type obtains a communication service through a relay of the device of the first type in a D2D communication, and
   the at least one processor is configured to generate, based on the indication information, the access request information with respect to the other user equipment in a case that the other user equipment is determined to be of the first type.

4. The wireless communication device according to claim 3, wherein the at least one processor is configured to
   determine an identification of the other user equipment based on the synchronization signal of the other user equipment; and
   the generated access request information includes the identification of the other user equipment.

5. The wireless communication device according to claim 3, wherein the communication service comprises a connection to a cellular network and a connection to a wireless network.

6. The wireless communication device according to claim 3, wherein the at least one processor is configured to generate activation request information for requesting a serving cell to specify the user as the second-type device.

7. The wireless communication device according to claim 6, wherein the activation request information contains a device identification of the user equipment and location information of the user equipment.

8. The wireless communication device according to claim 2, wherein
   the device of the first type serves as a synchronization reference for the device of the second type in a D2D communication, and
   the at least one processor is configured to synchronize with the other user equipment in a case that the other user equipment is determined to be of the first type based on the indication information.

9. The wireless communication device according to claim 2, wherein
   the synchronization signal is on an unauthorized frequency band from the other user equipment, and
   the root index corresponding to the synchronization signal sequence includes a root index corresponding to a synchronization signal sequence for a cell.

10. The wireless communication device according to claim 1, wherein the at least one processor is configured to:

determine an identification of the other user equipment based on the synchronization signal of the other user equipment; and determine the predetermined time interval based on the identification of the other user equipment.

11. The wireless communication device according to claim 1, wherein the wireless communication device operates as the user equipment, and the wireless communication device further comprises a transceiving apparatus configured to receive the synchronization signal from the other user equipment on an unauthorized frequency band.

12. The wireless communication device according to claim 11, wherein the at least one processor is configured to determine the unauthorized frequency band based on broadcast information from a serving cell.

13. The wireless communication device according to claim 1, wherein in a case where the user equipment is out of coverage of a serving base station, the at least one processor is configured to:

select a root index from a predetermined set of root indexes; and generate the synchronization signal of the user equipment according to the root index.

14. The wireless communication device according to claim 1, wherein the at least one processor is configured to trigger a detection for the synchronization signal from the other user equipment in a case where a communication quality of the user equipment is lower than a predetermined level.

15. The wireless communication device according to claim 1, wherein in a case where there are a plurality of accessible user equipments, the at least one processor is configured to determine a user equipment to access, according to one or more of:

the type of communication service relayed by an accessible user equipment;

the network connection quality of an accessible user equipment;

the distance from an accessible user equipment; and the quality of a signal from an accessible user equipment.

16. A wireless communication device for a user equipment, the wireless communication device comprising:

at least one processor configured to determine a device-to-device (D2D) communication requirement of the user equipment and a type of the user equipment;

generate a synchronization signal for a D2D communication;

transmit the synchronization signal for synchronization of an other user equipment by the D2D communication; and control transmission of access request information according to a monitor timing, wherein the type comprises a first type and a second type, the first type being different from the second type, D2D communication content transmitted by a device of the first type has a higher priority than D2D communication content transmitted by a device of the second type, the monitor timing being after a timing of transmission of the synchronization signal by a predetermined timing interval, and the at least one processor is further configured to preferentially read data transmitted by the other user equipment in a case that the other user equipment is determined to be of the first type based on the indication information.

17. A wireless communication device for a base station, the wireless communication device comprising:

at least one processor configured to determine a type of a user equipment served by the base station; and determine for the user equipment, based on the type of the user equipment, information relating to a root index corresponding to a synchronization signal sequence available to the user equipment, wherein the type comprises a first type and a second type, root indexes of synchronization signals available to different types of user equipments belong to different sets, the user equipment determines a monitor timing, of an other user equipment based on the synchronization signal, for controlling transmission of access request information, the monitor timing being after a timing of the synchronization signal by a predetermined timing interval, device-to-device (D2D) communication content transmitted by a device of the first type has a higher priority than D2D communication content transmitted by a device of the second type, and user equipment preferentially reads data transmitted by the other user equipment in a case that the other user equipment is determined to be of the first device based on the indication information.

* * * * *